United States Patent
Cherouvrier

(10) Patent No.: US 8,434,578 B2
(45) Date of Patent: May 7, 2013

(54) POWER STORAGE DEVICE FOR HYBRID OR ELECTRIC MOTOR VEHICLES, AND ASSOCIATED ELECTRIC POWER MANAGEMENT METHOD

(75) Inventor: Guillaume Cherouvrier, Argenteuil (FR)

(73) Assignee: Peugeot Citroen Automobiles SA (FR)

( * ) Notice: Subject to any disclaimer, the term of this patent is extended or adjusted under 35 U.S.C. 154(b) by 264 days.

(21) Appl. No.: 13/001,939

(22) PCT Filed: Jul. 3, 2009

(86) PCT No.: PCT/FR2009/051309
§ 371 (c)(1),
(2), (4) Date: Dec. 29, 2010

(87) PCT Pub. No.: WO2010/001070
PCT Pub. Date: Jan. 7, 2010

(65) Prior Publication Data
US 2011/0108340 A1    May 12, 2011

(30) Foreign Application Priority Data
Jul. 4, 2008    (FR) ...................................... 08 54571

(51) Int. Cl.
*B60K 1/00*    (2006.01)
(52) U.S. Cl.
USPC .................................. 180/65.31; 180/65.265
(58) Field of Classification Search ................ 180/65.1, 180/65.2, 65.31, 65.8, 65.26, 65.285, 65.28, 180/65, 265, 65.21; 318/139, 375, 434
See application file for complete search history.

(56) References Cited

U.S. PATENT DOCUMENTS

| | | | |
|---|---|---|---|
| 5,563,479 A * | 10/1996 | Suzuki | 318/139 |
| 5,705,859 A | 1/1998 | Karg et al. | |
| 6,109,237 A * | 8/2000 | Pels et al. | 123/339.19 |
| 6,262,561 B1* | 7/2001 | Takahashi et al. | 320/104 |
| 6,936,934 B2* | 8/2005 | Morimoto et al. | 180/65.26 |
| 6,963,183 B1* | 11/2005 | Kessler et al. | 318/434 |
| 7,075,194 B2* | 7/2006 | Weidenheimer et al. | 180/65.31 |
| 7,190,133 B2* | 3/2007 | King et al. | 180/65.285 |
| 7,419,020 B2* | 9/2008 | Pott et al. | 180/65.1 |

(Continued)

FOREIGN PATENT DOCUMENTS

| | | |
|---|---|---|
| DE | 10 2006 018624 A1 | 10/2007 |
| WO | 2007/037972 A2 | 4/2007 |

OTHER PUBLICATIONS

International Search Report from Corresponding PCT Application No. PCT/FR2009/051309 issued Nov. 5, 2009.

*Primary Examiner* — Hau Phan
(74) *Attorney, Agent, or Firm* — Polster, Lieder, Woodruff & Lucchesi, L.C.

(57) ABSTRACT

The invention essentially relates to an electric power storage device (1) for hybrid or electric motor vehicles, comprising: a high voltage power supply bus (2) to be connected to an electric traction system (7) and/or to an onboard electric power system, and a first electric power storage element (3) connected to said power supply bus (2). According to the invention, a second storage element (4) is connected to the bus (2) via an electric coupling member (5), said second storage element (4) being connected to the bus (2) in parallel relative to the first storage element (3). One of the two storage elements (3, 4) includes an electrochemical battery, while the other storage element (3, 4) includes an ultracapacitor.

9 Claims, 2 Drawing Sheets

U.S. PATENT DOCUMENTS

| | | |
|---|---|---|
| 7,973,499 B2 * | 7/2011 | Yoshioka ............... 318/139 |
| 2005/0279544 A1 | 12/2005 | Pott et al. |
| 2006/0137918 A1 * | 6/2006 | Dinser et al. ............ 180/65.1 |
| 2006/0249318 A1 * | 11/2006 | Weidenheimer et al. .... 180/65.2 |

* cited by examiner

POWER STORAGE DEVICE FOR HYBRID OR ELECTRIC MOTOR VEHICLES, AND ASSOCIATED ELECTRIC POWER MANAGEMENT METHOD

CROSS-REFERENCE TO RELATED APPLICATIONS

The present application is the US national stage under 35 U.S.C. §371 of International Application No. PCT/FR2009/051309 which was filed on Jul. 3, 2009 and which claims the priority of French application 0854571 filed on Jul. 4, 2008.

BACKGROUND

The present invention relates to a power storage device for hybrid or electric automotive vehicles and an associated electric power management method. The specific goal of the invention is to improve the compromise between cost, performance and life of such a power storage device.

A hybrid vehicle comprises an internal combustion engine in association with an electric drive system, such as an electric machine. The general working principle of this type of vehicle is to operate either the electric machine (pure electric mode), when the vehicle runs at a speed lower than a threshold speed (for instance 60 km/hour), specifically in urban areas; or the internal combustion engine (thermal mode), when the vehicle runs at a speed greater than the threshold speed, outside urban areas.

When the electric machine provides traction to the vehicle, it draws energy from a power storage device. In the recuperation phases, in particular during the braking phases of the vehicle, the kinetic energy of the vehicle is transformed into electric energy stored inside the storage device.

These vehicles have an on-board electrical network comprising all of the energy consuming elements of the vehicle, such as headlights, radio, windshield wipers or air conditioning, connected to the storage device in order to draw energy from it for its operation.

Known energy storage devices come in the form of batteries with electrochemical cells which transform electrical energy in chemical energy (and vice versa) thanks to the electrochemical reactions of their electrodes. Known battery types are lead oxide-sulfuric acid, nickel metal hydride, Li-ion, lithium polymer, etc.

Among electrochemical cell batteries we distinguish "energetic" type batteries and "power" type batteries. Energetic batteries have higher internal resistance than power batteries and deliver energy for a longer period of time than energetic batteries; on the other hand, taking into account their higher internal resistance, energetic batteries deliver less power than power batteries.

The "energetic" or "power" type differentiation of the battery takes place when the battery is produced. Indeed, the more the electrodes of the battery are covered with active material, the greater its storage capacity, the greater its internal resistance, which implies lower power supply. Inversely, the less the electrodes of the battery are covered with active material, the lower its storage capacity, and the lower its internal resistance, which implies high power supply.

However, because of the relatively high internal resistance of electrochemical batteries, it is necessary to use numerous accumulators in order to obtain batteries that meet the power requirements of the vehicle, which results in excessive occupied space.

Supercapacitors are also known. Supercapacitors are comprised of two electrodes impregnated with electrolyte and separated by an isolating and porous membrane (to provide ionic conduction). The electrical charges accumulate on the electrodes and the electrolyte provides the electrical compensation for the accumulation of charges.

These supercapacitors are capable of delivering significant power during a relatively short time. Compared to electrochemical cell batteries (of the "energetic" or "power" type), supercapacitors have significantly lower storage capacity but superior power and yield.

BRIEF SUMMARY

The principle of the invention rests on the association of these different energy storage technologies in order to exploit their respective advantages.

The invention uses a first storage element of electrical energy and a second storage element connected to each other by means of an electrical coupling element that adapts the voltage level of the first storage element to the voltage level of the second storage element and vice versa. One of the two storage elements comprises an electrochemical cell battery, while the other storage element comprises a supercapacitor.

In the invention, the electrochemical cell battery keeps the charge of the supercapacitor in a functional state of charge, i.e., in state of charge such that the supercapacitor can store energy when the vehicle enters a recuperation phase, or supply energy when the vehicle enters a phase of electrical operation.

For this purpose, if during an energy recuperation phase the voltage of the supercapacitor reaches a voltage corresponding to the charged state of the supercapacitor, the battery will draw energy from the supercapacitor at a suitable current to lower the charge state of the supercapacitor, in order to enable the supercapacitor to store more energy if needed.

If during an electrical drive phase of the vehicle, the voltage of the supercapacitor reaches a voltage corresponding to the discharged state of the supercapacitor, the battery will supply energy to the supercapacitor at a suitable current to raise the charge state of the supercapacitor, in order to enable the supercapacitor to supply more energy to the electrical machine if needed.

The invention allows the use of a smaller electrochemical battery, which implies reduction of battery mass, occupied space, electrical power, and capacity. Furthermore, the invention allows a reduction of the current and therefore limits the thermal heating of the storage device.

The invention relates therefore to an electrical energy storage device for hybrid or electrical automotive vehicles, characterized in that it comprises:
a high voltage power supply bus that can be connected to an electrical traction system and/or an on-board electrical network,
a first storage element of electrical energy connected to said power supply bus,
characterized in that it further comprises:
a second storage element connected to the high voltage power supply bus through the intermediary of an electrical coupling element that adapts the voltage level of the first storage element to the voltage level of the second storage element and reciprocally,
the second storage element is connected to the bus in parallel relative to the first storage element,
one of the storage elements comprises a battery with electrochemical cells, while the other storage element comprises a supercapacitor.

According to one implementation form, the first storage element connected to the bus is a supercapacitor, and the second storage element comprises an electrochemical cell battery.

According to one implementation form, the first storage element comprises a supercapacitor delivering a voltage between 80 and 150 Volt and suitable to supply power between 15 and 35 kW.

According to one embodiment, the second storage element comprises an electrochemical cell battery delivering a voltage between 12 and 60 Volt and with storage capacity between 2 and 20 Mega Joules.

According to one embodiment, the coupling element is a reversible direct-direct (DC/DC) converter with power between 1 and 5 kW.

The invention also relates to a hybrid or electrical type of automotive vehicle equipped with an energy storage device according to the invention, characterized in that it comprises:

an on-board network connected to the high voltage bus through the intermediary of an electrical coupling element, and an electrical drive system connected to the high voltage bus through the intermediary of an alternating/direct converter.

According to one implementation form, the converter accepts voltages between 80 and 150 Volts and has a power of approximately 40 kW, while the direct/direct (DC-DC) converter supports a power of approximately 1 kW.

The invention further relates to an electrical energy management system in a hybrid or electrical vehicle according to the invention, characterized in that, in a phase of pure electric drive, the electric drive system draws energy from the terminals of the supercapacitor to ensure traction of the vehicle, while electrical energy is transferred from the battery to the supercapacitor through the intermediary of the coupling element in order to compensate the energy draw.

According to one embodiment, in an electrical energy recuperation phase, the supercapacitor stores the energy supplied by the electrical drive system; while electrical energy is transferred from the supercapacitor to the battery through the intermediary of the coupling element in order to slow down the charging of the supercapacitor.

According to embodiment, if at the end of an energy recuperation phase (respectively at the end of a pure electrical drive phase), the supercapacitor is in charged state (respectively in discharged state), then, by preference during a pure thermal drive phase, a transfer of energy takes place from the supercapacitor to the battery (respectively from the battery to the supercapacitor), so that the charge level of the supercapacitor is such that the supercapacitor can store electrical energy supplied by the electrical drive system if the vehicle enters an energy recuperation phase; or supply energy to the electrical drive system if the vehicle operates in electrical mode.

BRIEF DESCRIPTION OF THE FIGURES

The invention will be better understood by reading the following description and by examining the accompanying figures. These figures are provided as non-limiting illustrations of the invention. They show.

Identical elements retain the same reference from one figure to another.

DETAILED DESCRIPTION

Figure 1:
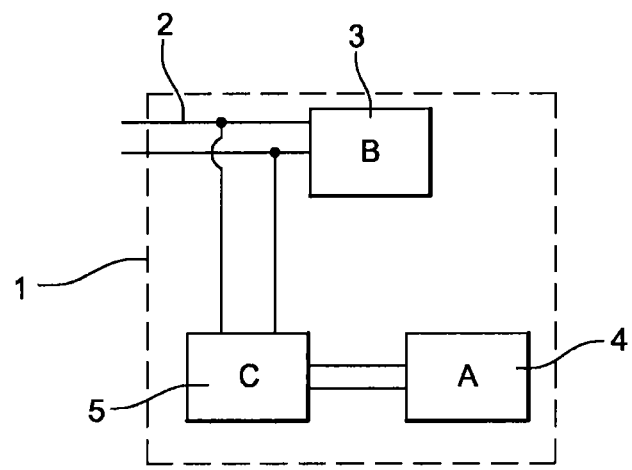
FIG. 1: a schematic representation of the general principle of the electrical energy storage device according to the invention.

FIG. 1 shows a storage device 1 comprising a high voltage direct current power supply bus 2 intended to be connected to the electrical drive system of the vehicle, such as an electrical machine, and/or to the on-board electrical network of said vehicle.

A first storage element 3 of electrical energy is connected to bus 2. A second storage element 4 of electrical energy is connected to bus 2 through the intermediary of electrical coupling element 5. This second storage element 4 is connected to bus 2 via element 5, in parallel relative to the first element 3.

The coupling element 5 is a reversible direct/direct (DC-DC) converter that adapts the voltage level of the first storage element 3 to the voltage level of the second storage element 4 and vice versa.

In one implementation mode of the invention, a storage element 3 or 4 with low internal resistance such as a supercapacitor is combined with a storage element 3 or 4 with high storage capacity, such as an energetic or power type electrochemical cell battery. This arrangement meets the high power requirements of bus 2 of the vehicle over the longest possible period of time.

In a variant, one of the storage elements 3 or 4 takes the form of a power battery, while the other storage element 3 or 4 takes the form of an energetic battery.

Figure 2:
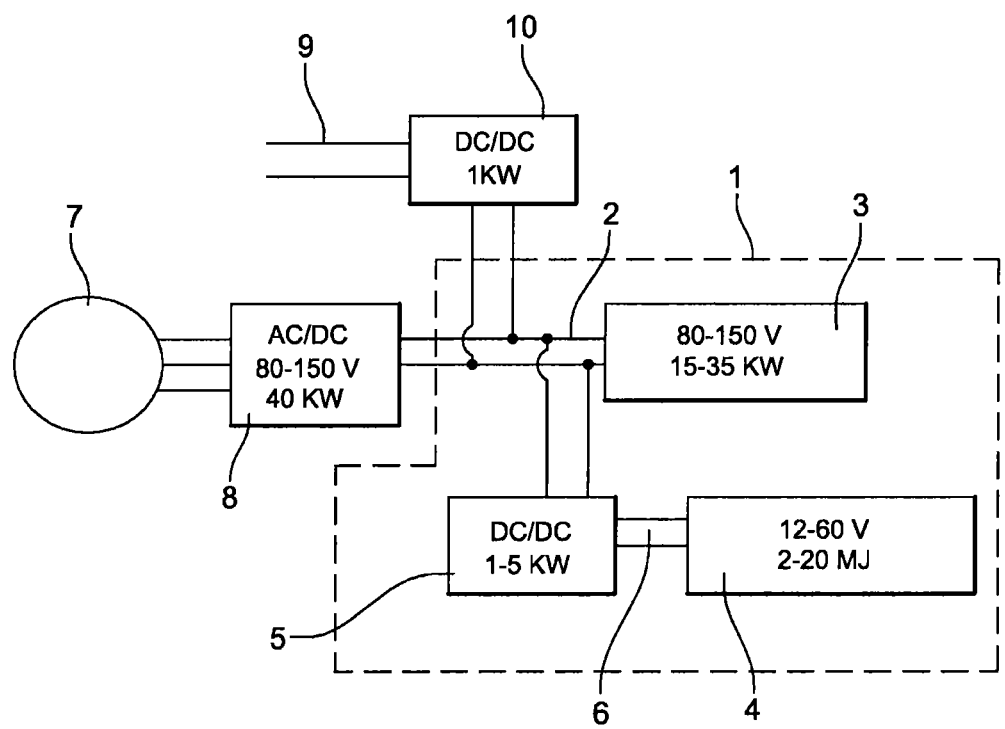
FIG. 2: a schematic representation of a preferred implementation mode of the storage device according to the invention connected to the electrical drive system and the on-board electrical network of the vehicle.

FIG. 2 shows an example of a preferred implementation form of the storage device 1 according to the invention.

According to this implementation form, the first storage element 3 comprises a supercapacitor delivering a voltage between 80 and 150 Volt suitable to supply power between 15 and 35 kW.

The second storage element 4 comprises an electrochemical cell battery delivering a voltage between 12 and 60 Volt and with a storage capacity between 2 and 20 MJ (Mega Joules), this storage capacity can go up to 60 or 100 MJ in some implementation forms.

The coupling element 5 is a reversible direct-direct (DC/DC) converter with power between 1 and 5 kW.

In addition, a drive system 7, such as dynamo-electric machine, is connected to bus 2 through the intermediary of an electrical coupling element 8 in the form of a alternating/direct (AC/DC) converter. This element 8 accepts voltages between 80 and 150 V and has a power of approximately 40 kW. When machine 7 operates in a generating mode, element 8 operates in rectifying mode, converting the alternating voltage supplied by machine 7 to the continuous voltage applied to bus 2. When machine 7 operates in a motor mode, element 8 operates in undulating mode, converting the continuous voltage of bus 2 into a three phase alternating voltage applied to the phases of machine 7.

Furthermore, the bus 9 of the on-board electric network of the vehicle is connected to bus 2 through the intermediary of a direct/direct converter 10 supporting a power of approximately 1 kW. It is understood that the on-board electrical network is an electrical network comprising all of the electric power consuming elements of the vehicle connected in series or in parallel to bus 9. These electrical power consuming elements are in particular headlights, radio, air conditioning, windshield wipers, etc. The converter 10 adapts the voltage levels observable in the on-board network to the voltage levels observable in bus 2, and vice versa. The voltage of the on-board network is maintained at approximately 12V.

Figure 3:
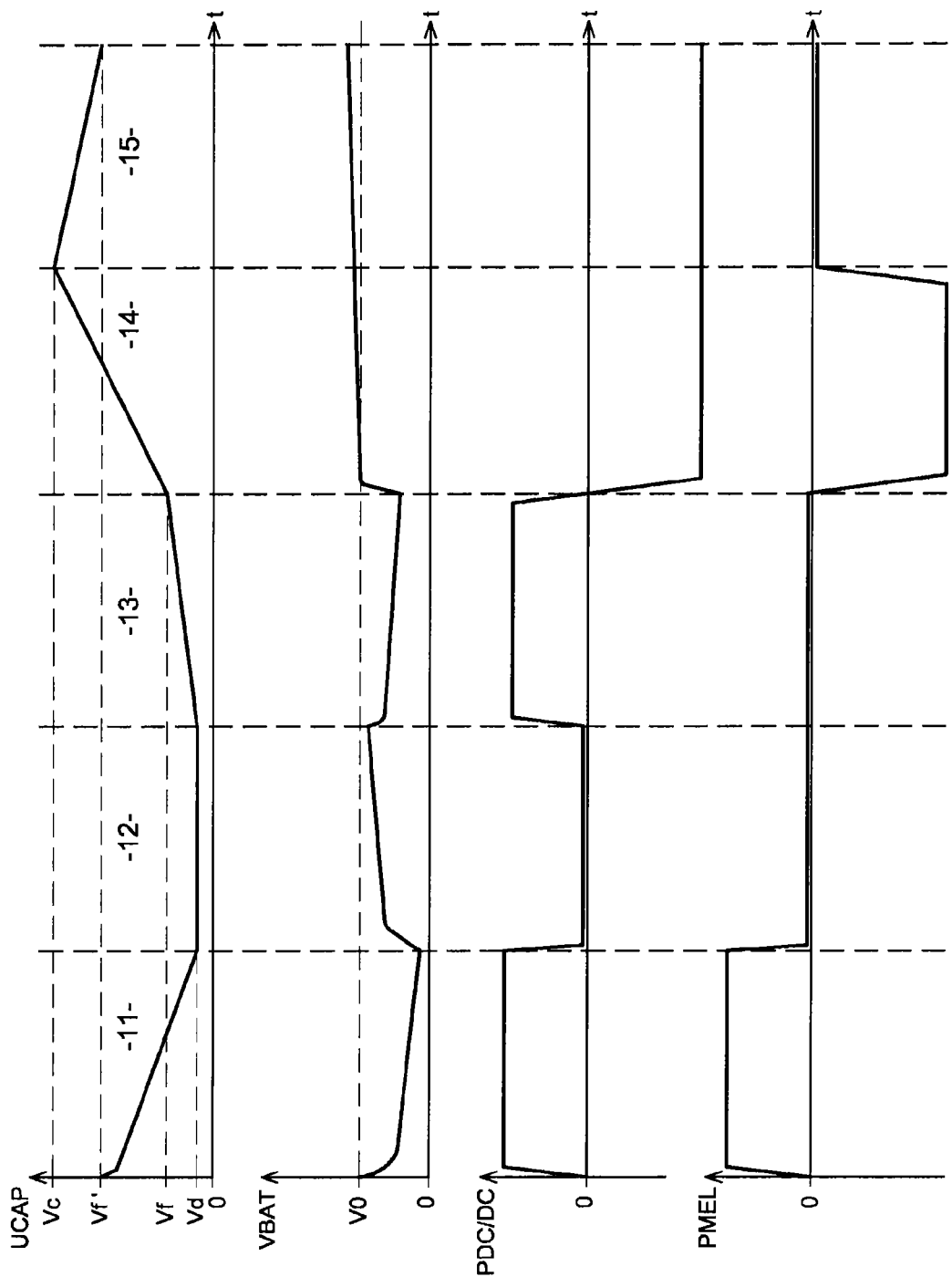
FIG. 3: time diagrams showing the voltage at the terminals of the storage elements, the power transfers between these elements, and the power of the electrical machine of a hybrid vehicle equipped with a storage device according to FIG. 2.

Device 1 of the invention further comprises a control unit (not shown) suitable for controlling the different elements 3, 4 and 5 of device 1 for the implementation of the energy management method according to the invention, illustrated by the time diagrams of FIG. 3.

More precisely, FIG. 3 shows graphs illustrating the evolution in time of voltages UCAP and VBAT respectively at the terminals of supercapacitor 3 and battery 4 of the storage device 1 according to FIG. 2, power transfers PDC/DC between supercapacitor 3 and battery 4, and the power PMEL of the electrical machine 7, during different operational phases 11-15 of a hybrid vehicle according to the invention.

When energy transfer takes place from battery 4 to supercapacitor 3, the power transfer PDC/DC is considered positive; while when the energy transfer takes place from supercapacitor 3 to battery 4, the power transfer PDC/DC is considered negative.

When dynamo-electric machine 7 operates in a motor mode, the power PMEL is positive; while when electrical machine 7 operates in a generating mode, the power PMEL is negative.

During operational phase 11, when the dynamo-electric machine 7 operates in a motor mode (PMEL positive), the dynamo-electric machine 7 draws energy from the terminals of supercapacitor 3 to ensure traction of the vehicle, so that voltage UCAP at the terminals of supercapacitor 3 diminishes. Otherwise, electrical energy is transferred from battery 4 to supercapacitor 3 (PDC/DC positive), in order to compensate the energy draw, so that the voltage VBAT at the terminals of battery 4 diminishes also. At the end of this phase 11, supercapacitor 3 has a voltage Vd corresponding to discharged state. For a hybrid vehicle, this phase 11 can be implemented in combination with a thermal drive phase (Boost mode).

During operational phase 12, when the vehicle operates in thermal (i.e., gas engine) mode, supercapacitor 3 and battery 4 are not solicited. Battery 4 relaxes and assumes a voltage Vo close to its zero current voltage. The voltage UCAP at the terminals of supercapacitor 3 remains essentially unchanged.

During operational phase 13, when the vehicle operates in thermal mode, energy transfer takes place from battery 4 to supercapacitor 3, discharging an electrical current starting from battery 4 to supercapacitor 3 through the intermediary of converter 5. The purpose of this energy transfer is to raise the voltage UCAP of supercapacitor 3 from Vd to a level Vf which allows the supercapacitor 3 to supply electrical energy to machine 7 when the vehicle enters another phase of electrical drive, or to store energy supplied by machine 7 when the vehicle enters an energy recuperation phase. In other words, in this phase 13, the voltage of supercapacitor 3 is raised in order to maintain the supercapacitor 3 in the best possible operational state.

During a recuperative braking phase 14, the vehicle slows down and uses dynamo-electric machine 7 as electrical generator (PMEL negative), in order to transform the kinetic energy of the vehicle into electrical energy. The supercapacitor 3 stores the energy supplied by the dynamo-electric machine 7 so that the voltage UCAP at its terminals increases. At the end of this phase 14, the supercapacitor 3 has a voltage Vc corresponding to its charged state. It is possible but not mandatory to transfer electrical energy from supercapacitor 3 to battery 4 through the intermediary of converter 5 to slow down the charging of supercapacitor 3 (PDC/DC negative).

During operational phase 15, when the vehicle operates in thermal mode, energy transfer takes place from supercapacitor 3 to battery 4 (PDC/DC negative), discharging an electrical current from supercapacitor 3 to battery 4 through the intermediary of converter 5 in order to lower the voltage of supercapacitor 3 from voltage Vc to level Vf so that the supercapacitor 3 can again recuperate energy at the next braking, or supply energy to the electrical machine 7 if the vehicle enters a phase of electrical traction. In other words, in this phase 15, as in the preceding phase 13, the voltage of the supercapacitor is varied in order to maintain the supercapacitor 3 in the best possible functional state. In an example the voltage levels Vf and Vf' are essentially equal.

The invention claimed is:

1. A hybrid or electric type automotive vehicle equipped with an energy storage device; the energy storage system comprising
   a high voltage supply bus intended to be connected to at least one of an electrical drive system and an on-board electrical network,
   a first storage element for electrical energy connected to said supply bus,
   a second storage element connected to the high voltage bus through the intermediary of an electrical coupling element that adapts the voltage levels of the first storage element to the voltage levels of the second storage element and adapts the voltage levels of the second storage element to the voltage levels of the first storage element,
   the second storage element being connected to bus in parallel relative to the first storage element,
   one of the first storage element and second storage element comprising a battery with electrochemical cells, and the other of the first storage element and second storage element comprises a supercapacitor;
the vehicle comprising:
   an on-board network connected to the high voltage bus through the intermediary of a second electrical coupling element, and
   an electric drive system connected to the high voltage bus through the intermediary of an alternating/direct converter.

2. The hybrid or electric type automotive vehicle according to claim 1, wherein the supercapacitor delivers a voltage between 80 and 150 Volt and suitable to supply a power between 15 and 35 kW.

3. The hybrid or electric type automotive vehicle according to claim 1, wherein the battery with electrochemical cells delivers a voltage between 12 and 60 Volt and with storage capacity between 2 and 20 Mega Joules.

4. The hybrid or electric type automotive vehicle according to claim 1, wherein the coupling element is a direct-direct (DC/DC) reversible converter with power between 1 and 5 kW.

5. The vehicle according to claim 1, wherein the converter accepts voltages between 80 and 150 Volt and has a power of approximately 40 kW, while the direct/direct converter supports a power of approximately 1 kW.

6. A method for managing electrical energy in a hybrid or electric vehicle, the vehicle comprising:
   a high voltage supply bus intended to be connected to at least one of an electrical drive system and an on-board electrical network,
   a first storage element for electrical energy connected to said supply bus,
   a second storage element connected to the high voltage bus through the intermediary of an electrical coupling element that adapts the voltage levels of the first storage element to the voltage levels of the second storage element and, adapts the voltage levels of the second storage element to the voltage levels of the first storage element
the second storage element being connected to bus in parallel relative to the first storage element,
one of said first storage element and said second storage element comprising a battery with electrochemical cells, and the other of said first storage element and second storage element comprises a supercapacitor;
an on-board network connected to the high voltage bus through the intermediary of a second electrical coupling element, and
an electric drive system connected to the high voltage bus through the intermediary of an alternating/direct converter;

wherein, when the vehicle is operated in a pure electrical drive phase, the method comprises the electrical drive system drawing energy from the terminals of supercapacitor to ensure the traction of the vehicle, while electrical energy is transferred from the battery to the supercapacitor through the intermediary of a coupling element in order to compensate the energy draw.

7. The method according to claim 6, wherein, when the vehicle is in a recuperation phase of electrical energy, the method comprises the supercapacitor storing energy supplied by the electrical drive system; while electrical energy is transferred from supercapacitor to the battery through the intermediary of the coupling element in order to slow down the charging of the supercapacitor.

8. The method according to claim 6, wherein, if at the end of en energy recuperation phase, the supercapacitor is in charged state, a transfer of energy takes place, by preference during a pure combustion engine drive phase, from supercapacitor to battery, so that the charge level (Vf, Vf') of the supercapacitor is such that the supercapacitor can store electrical energy supplied by the electrical drive system if the vehicle enters an energy recuperation phase; or supply energy to the electrical drive system if the vehicle operates in electric mode.

9. The method according to claim 6, wherein, if at the end of a pure electrical traction phase, the supercapacitor is in a discharged state, a transfer of energy takes place, by preference during a pure combustion engine drive phase, from battery to supercapacitor, so that the charge level (Vf, Vf') of the supercapacitor is such that the supercapacitor can store electrical energy supplied by the electrical drive system if the vehicle enters an energy recuperation phase; or supply energy to the electrical drive system if the vehicle operates in electric mode.

* * * * *